(12) United States Patent
Stephens et al.

(10) Patent No.: US 7,231,553 B2
(45) Date of Patent: Jun. 12, 2007

(54) SYSTEM AND METHOD FOR TESTING COMPUTING DEVICES

(75) Inventors: Scott Stephens, Bothell, WA (US); James Stephens, II, Redmond, WA (US); Brandon Allsop, Monroe, WA (US); Adrien Oney, Woodinville, WA (US); Lonny Dean McMichael, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/269,088

(22) Filed: Nov. 8, 2005

(65) Prior Publication Data

US 2006/0069950 A1    Mar. 30, 2006

Related U.S. Application Data

(63) Continuation of application No. 10/307,061, filed on Nov. 26, 2002, now Pat. No. 7,103,802.

(51) Int. Cl.
*G06F 11/00* (2006.01)
(52) U.S. Cl. .......................... 714/32; 714/33; 714/37; 710/303; 710/304
(58) Field of Classification Search .................. 714/32, 714/33, 37; 710/303, 304; 709/224
See application file for complete search history.

(56) References Cited

U.S. PATENT DOCUMENTS

| | | | |
|---|---|---|---|
| 5,745,391 A * | 4/1998 | Topor | ......................... 713/321 |
| 6,332,202 B1 | 12/2001 | Sheikh et al. | |
| 6,549,968 B1 | 4/2003 | Hart | |
| 6,647,526 B1 | 11/2003 | Holder et al. | |
| 6,704,826 B1 | 3/2004 | Lam et al. | |
| 6,704,827 B1 | 3/2004 | Smith et al. | |
| 6,732,296 B1 | 5/2004 | Cherny et al. | |
| 6,772,265 B2 | 8/2004 | Baweja et al. | |
| 6,804,740 B1 | 10/2004 | Watts, Jr. | |
| 6,823,415 B1 | 11/2004 | Asaad et al. | |
| 6,868,468 B2 | 3/2005 | Boz et al. | |
| 6,883,054 B2 | 4/2005 | Yamaguchi et al. | |

(Continued)

OTHER PUBLICATIONS

"32/64 Bit Universal PCI Extender With Live Insertion," *Ultraview New Dimensions in Instrumentation*, n.d., <http://www.ultraviewcorp.com/data/pciext64u.html> [retrieved Aug. 6, 2002].

(Continued)

*Primary Examiner*—Robert Beausoliel
*Assistant Examiner*—Joseph D Manoskey
(74) *Attorney, Agent, or Firm*—Christensen O'Connor Johnson Kindness PLLC (57) ABSTRACT

An automated system for improving the testing of computer devices designed for coupling with docking devices. A plurality of networked computing devices that are individually connected to a compatible docking device through a slave switch. Each slave switch independently connects or disconnects individual computing devices from an attached docking device based on commands obtained from a server. By controlling the electrical connection between the individual computing devices and attached docking devices, the slave switch can simulate the action of docking or undocking one or more selected computers without human intervention. As a result, the present invention provides a system and method that automates the action of docking or undocking a computer. For example, the present invention is suited for use in computer device testing systems wherein a shut down command is sent to a selected computer, after which the selected computer is disconnected from an attached docking device.

14 Claims, 7 Drawing Sheets

U.S. PATENT DOCUMENTS

| | | |
|---|---|---|
| 6,883,055 B2 | 4/2005 | Chen et al. |
| 7,103,802 B2 * | 9/2006 | Stephens et al. ............... 714/32 |
| 2001/0054161 A1 | 12/2001 | Wooddruff |
| 2002/0052940 A1 | 5/2002 | Myers et al. |
| 2002/0178400 A1 | 11/2002 | Venkataraman |

OTHER PUBLICATIONS

"Slep Mode," *Webster's New Millennium™ Dictionary of English*, Preview Edition (v 0.9.6), Lexico Publishing Group, LLC, © 2003-2005, <http://www.dictionary.com>.

*User Manual for Universal PCI Bus Extender, Model PCIEXT64U*, Rev. A, Oct. 22, 2001, Rev. F, Sep. 17, 2002, Ultraview Corporation, Orinda, California.

* cited by examiner

Fig. 1.

(PRIOR ART)

*Fig. 5A.*   (TO MASTER SWITCH)

*Fig. 5B.*   (TO MASTER SWITCH)

SYSTEM AND METHOD FOR TESTING COMPUTING DEVICES

CROSS-REFERENCE TO RELATED APPLICATION

This application is a continuation of U.S. application Ser. No. 10/307,061, filed Nov. 26, 2002 now U.S. Pat. No. 7,103,802.

BACKGROUND

In recent years, there has been a tremendous growth in the use of portable computing devices, such as laptop computers, personal data assistants (PDAs), computerized mobile phones, and the like. Accordingly, the increased use of portable computing devices has placed additional production demands on existing manufacturing and testing capabilities. The increased production demands, along with a longstanding interest to continually improve the quality of manufactured computer products, have intensified a continuing need to improve the efficiency of hardware and software test procedures. In addition, as described more fully below with respect to FIG. 1, the need for improved efficiency is especially acute with respect to computer hardware, such as laptop computers designed for connection to a docking device or station, that must be docked and undocked during testing.

One way to improve the efficiency of test procedures is to automate test procedures to the extent possible. For example, some existing testing systems utilize customized scripts and macros to run software applications to identify defects in software being tested. Although automation tools such as scripts and macros improve software test procedures, such automation tools have limitations. For example, tests involving the docking, undocking, and redocking of a computer, in the past, cannot be carried out by a script or macro alone. As described in the following example, such tests have traditionally required a human tester to perform the docking, undocking, and redocking steps.

Figure 1:
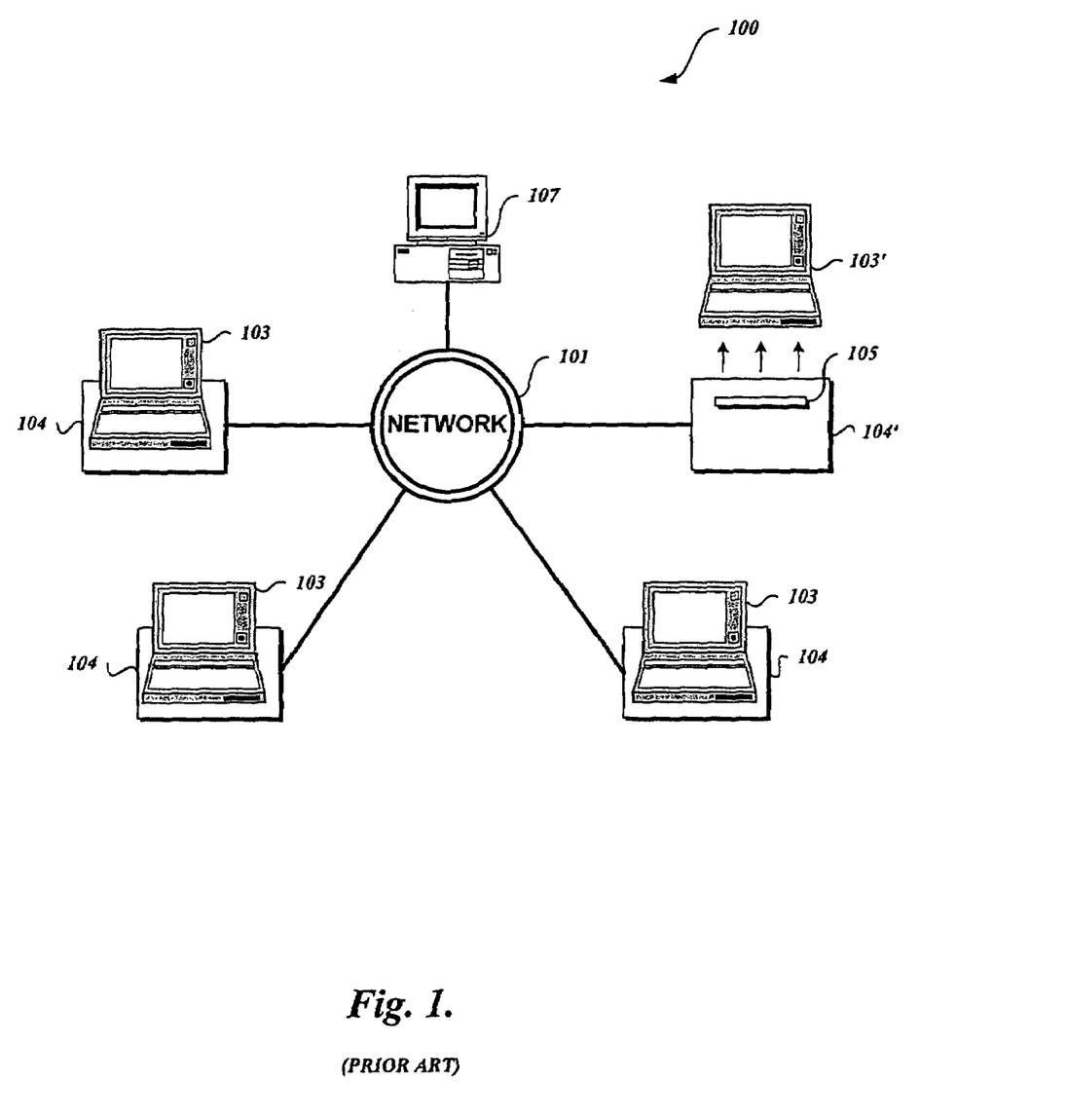
FIG. 1 is a block diagram of a prior art system for testing computing devices couplable to docking devices.

FIG. 1 illustrates an example of a conventional computer system 100 test set up designed to test portable computing devices, such as laptop computers. More specifically, the computer system 100 includes a test server 107 that is in communication with a plurality of portable computing devices 103 via a network 101 and a plurality of docking devices 104 (also called docking stations). In a conventional manner, each of the plurality of docking devices 104 connects a computing device 103 to the network 101. In this conventional arrangement, the docking devices 104 also connect many other resources to each computing device 103, such as a power source, access to external storage devices, or the like. Each of the docking devices 104 includes a multi-conductor connector 105 for connecting a computing device to an associated docking device. As will be readily appreciated by those of ordinary skill in the relevant art and others, as shown in the upper right in FIG. 1, the connector 105 is configured to allow a user to remove a selected computing device 103' from an associated docking device 104'.

The computer system 100 depicted in FIG. 1 is designed for testing operating systems or software applications running on the computing devices 103 that may be effected by the docking or undocking of the computer devices from their respective docking stations 104. For example, in a test of an operating system, it may be desirable to determine if the operating system running on a computing device 103' properly manages the resources associated with the related docking device 104', such as the operating state of an external drive prior to undocking, so that the selected computing device 103' can be successfully removed from the related docking device 104'. In such a test, a test operator may manually instruct the selected computing device 103' to transition into a sleep mode. To determine if the selected computing device 103' has properly transitioned to a sleep mode and properly managed the resources associated with the associated docking device 104' when entering the sleep mode, the test operator must physically remove the selected computing device 103' from the related docking device 104'. This task requires a person to wait for the computer to transition into sleep mode before he or she can remove the selected computing device 103 for inspection. After inspection, the selected computing device 103' may have to be physically reattached to the related docking device 104' in order to complete other test objectives. As will be appreciated by those skilled in the art and others, this test procedure requires a substantial amount of human resource time in order to test even a small number of computing devices.

Existing computer test systems present additional drawbacks when used to test a large number of computing devices designed to be connected to docking devices or stations. Such test environments are often hampered by the cumbersome task of coordinating the actions of a large number of human testers assigned to dock or undock many different computers at specific times. Among other disadvantages, this requirement results in many problems caused by human error.

As will be readily understood from the foregoing, a need exists for computerized test systems that improves the testing of computer hardware and software. More specifically, there is a need for an automated system and method that can independently control the "docking and/or undocking" of computing devices from their associated docking stations during a software test procedure with minimal human intervention.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to a system and method for improving the testing of computing devices that are designed for coupling with docking devices. In accordance with the invention, a system that includes a plurality of slave switches, each slave switch controlling the electrical connection between an individual computing device and its associated docking device, is provided. In one form, the slave switches are configured to electrically isolate a computing device from an associated docking device based on commands obtained from a master switch or a server. Controlling the electrical connection between an individual computing device and an associated docking device allows the slave switch to perform an action that simulates the action of docking or undocking a computing device. As a result, the present invention provides a system and method that automates a test procedure that requires the action of docking or undocking a computer without human intervention.

In accordance with other aspects of the present invention, the slave switches include a plurality of individual switches that control the connectivity between contacts of a computing device connector and contacts of a related docking device connector. Responsive to control signals, each switch electrically isolates individual contacts of the computing device connector from corresponding contacts of the docking device connector. Responsive to other control signals, each switch electrically connects the contacts of the computing device connector to the corresponding contacts of the docking device connector.

In accordance with other aspects of the present invention, the slave switch includes a mechanical actuator configured to control the connectivity between a computing device connector and a docking device connector. Responsive to control signals, the mechanical actuator moves the docking device connector between positions where the docking device connector engages with or disengages from the computing device connector. In one form, the slave switch includes a slave switch connector controlled by the actuator that is connected to the docking device connector by a flexible cable.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to providing systems and methods for improving the testing of computing devices that are designed for coupling with docking devices. An exemplary system formed in accordance with the invention includes a plurality of slave switches, each slave switch controlling the electrical connection between individual computing devices and their associated docking devices. The slave switches are configured to electrically isolate, either electronically or electro-mechanically, a computing device from an associated docking station, based on commands received from a control unit. Controlling the electrical connection between individual computing devices and their associated docking devices allows the slave switches to perform an action that is equivalent to the action of docking or undocking the computing devices. As a result, the present invention provides a system and method that automates a test procedure that requires the action of docking or undocking a computer, without human intervention.

The following description of the present invention first provides an overview of a test system in which the invention may be implemented. Following that, a description of the hardware components of electronic and electro-mechanical systems built according to the present invention is provided. Lastly, exemplary methods of testing a plurality of dockable computing devices are described.

Figure 2:
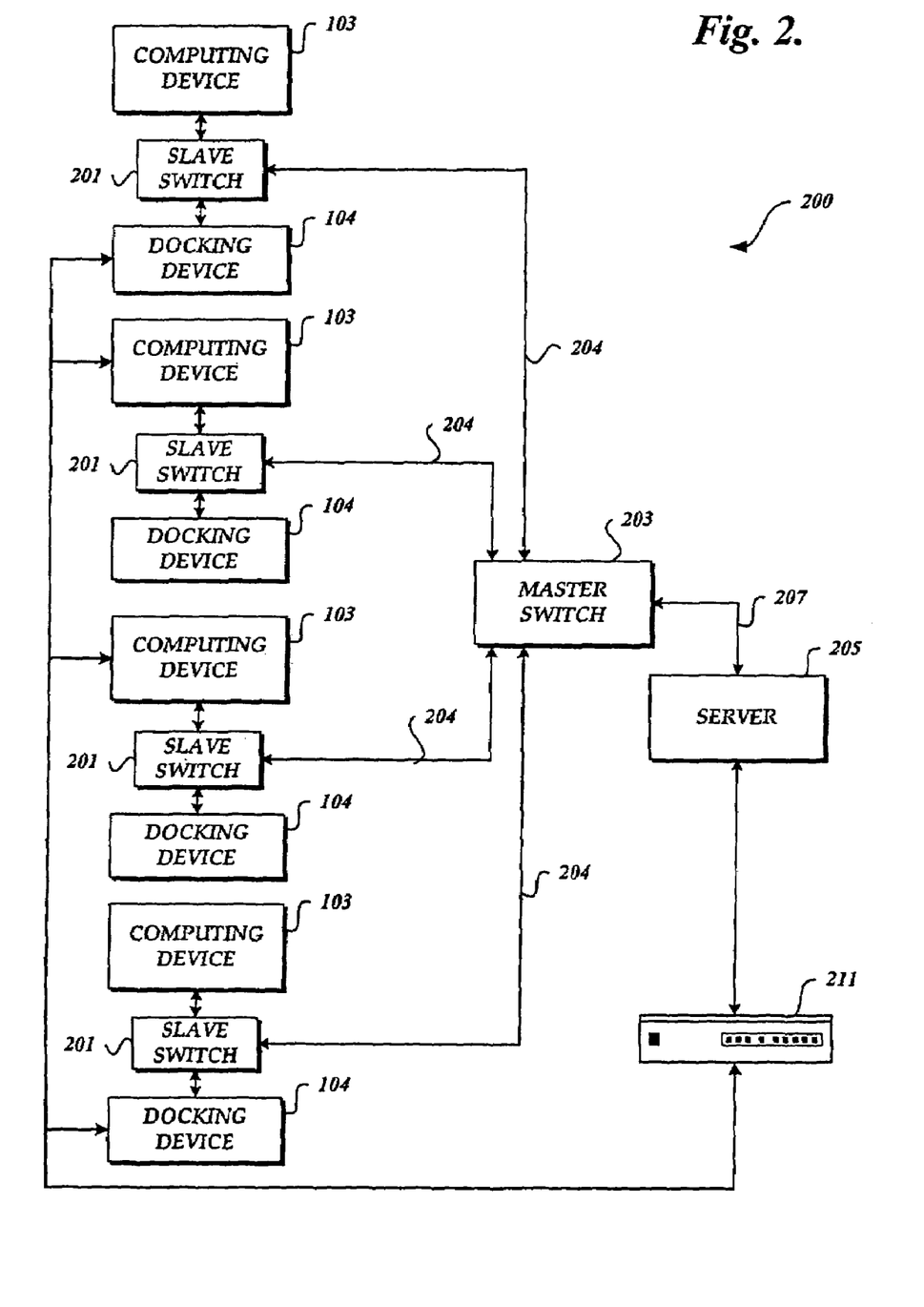
FIG. 2 is a block diagram illustrative of a test system formed in accordance with the present invention for testing computing devices couplable to docking devices, the system including a server that controls a plurality of slave switches configured to electronically connect and disconnect individual computing devices from individual docking devices.

FIG. 2 is a block diagram of an exemplary embodiment of a test system 200 suitable for implementing the present invention. Like FIG. 1, the test system 200 includes a plurality of computing devices 103, each individually connectable to an associated docking device 104. However, rather than being directly connected together, the computing devices 103 are each connected to their associated docking devices 104 through a slave switch 201. Each slave switch 201 is configured to independently control the electrical connectivity between individual computing devices 103 and their associated docking devices 104. Responsive to control signals received from a master switch 203, the slave switches 201 create either a short circuit or open circuit between the computing devices 103 and their associated docking devices 104. Although FIG. 2 depicts a test system 200 having four computing devices 103, those skilled in the relevant art and others will appreciate that this number should be taken as exemplary, not limiting. Similar test systems configured to accommodate less or orders of magnitude greater numbers of computing devices 103 fall within the scope of the present invention.

While the master switch 203 can take on a variety of forms, in one embodiment of the invention, the master switch 203 is a stand-alone unit that comprises the software and hardware components operative to receive control commands from a server 205 and translate the received commands into electronic signals suitable for controlling individual slave switches 201. Depending on implementation, the master switch 203 can communicate with each slave switch 201 by the use of any well-known wired or wireless system, diagramatically illustrated as a wired communication link 204 in FIG. 2. Alternatively, the master switch 203 may be integrated into another computing device, such as the server 205. In such an embodiment, commercially available controller cards can be installed in the server 205 to provide a plurality of outputs suitable for sending control signals directly to individual slave switches 201. FIG. 4 illustrates an exemplary master switch 203 whose structure and functional operation are described below.

The server 205 can be any type of computing device having suitable resources for executing test software. In one embodiment of the invention, the server 205 comprises conventional components, including a network interface for connecting to a plurality of docking devices 104 via a network 211, which function together to provide communication with the plurality of the computing devices 103. The server 205 also includes other generally known components (not shown), such as a processing unit, a display device, memory devices, etc. The memory devices include generally well known devices, such as random access memory (RAM), read-only memory (ROM), permanent mass storage memory, such as a disk drive, etc.

The server 205 stores program code for executing user-configured tests and controlling the system components depicted in FIG. 2. More specifically, in addition to controlling the operation of the master switch 203 and the slave switches 201 in the manner herein described, the server stores program code for testing the computing devices 103 via the docking devices and the network 211 in any of many well-known ways that do not form part of the invention. As will be appreciated by those of ordinary skill in the art, the executable program code can be in the form of a compiled application, a script-controlled program, or any combination thereof. For instance, with reference to FIG. 2, the server 205 may store the code for installing and executing an operating system program in a computing device. After installation, the server 205 may instruct the master switch 203 to electrically isolate the computing device from its associated docking device; thus, allowing a user to inspect the computing device and determine if the operating system was properly configured to allow the computing device to be undocked. As will be described in more detail below, the test system 200 may facilitate other docking testing procedures that involve hot docking, warm docking, surprise undocking, or many other like actions.

The server 205 is connected to the master switch 203 via a communication link 207. The communication link 207 may utilize any one or a combination of a variety of communication mediums and communication protocols. Examples of suitable wired communications methods include, but are not limited to, a Universal Serial Bus (USB) link, a wired digital data network, such as a local area network ("LAN"), or the like. Examples of suitable wireless communications methods include, but are not limited to a wireless network compliant with IEEE 802.11, or any other like system. One skilled in the relevant art will appreciate that additional or alternative well-known communication media/methods fall within the scope of the present invention that, for purposes of brevity, are not described here.

The computing devices 103 may comprise any type of electronic device that is designed to communicate with a docking device 104. One example of such a computing device 103 is a laptop computer having a central processing unit, a viewing monitor, keyboard, and various dynamic and static memory devices for storing an operating system and various applications. As known in the art, most commercially available laptop computers also include a multi-conductor connector that is configured to electrically connect with a connector of a docking station. Although this example of a computing device 103 describes a conventional laptop computer, those of ordinary skill in the art will appreciate that the computing device 103 may be constructed from a plurality of unconventional electronic devices or nonportable computing devices, such as a server or a work station. Other computing device examples are two-way pagers, tablet personal computers, cellular phones, personal data assistants ("PDA"), etc.

As shown in FIG. 2, the some computing devices 103 are communicatively connected to the server 205 through the network 211, the docking devices 104, and the slave switches 201. Also shown in FIG. 2, some computing devices 103 are directly connected to the network 211 without the use of the docking devices 104. As will be appreciated by those of ordinary skill in the art, the network 211 may take a variety of forms, including a signal network device such as a hub, and/or any number of coordinated network devices, such as routers, hubs, firewalls, and other like devices. The server 205, network 211, and computing devices 103 are each configured with the appropriate hardware and software drivers that allow the server 205 to communicate with each computing device 103 by the use of any known communication protocol when the computing devices 103 are connected to the docking devices 104 via the slave switches 201. As described in more detail below with reference to FIGS. 6 and 7, the server 205 may use the network 211 to instruct an individual computing device 103 to initiate a state change command, such as a shut down or sleep command.

The docking device 104 may be any device that is configured to electronically connect peripheral components to a computing device. For instance, the docking device 104 may be a commercially available docking station that is configured to attach peripheral components to a laptop computer. As known to those skilled in the art, docking devices are adapted to connect a wide variety of peripheral components to a connected computing device, such as a power source, network connection, universal serial bus link, etc. The docking device 104 may be relatively passive or may facilitate communication between the computing device 103 and other peripheral devices such as, for example, a network server.

The docking device 104 may include a housing formed to receive and support a portable computing device, such as a laptop. Alternatively, the docking device 104 may be in some other form, including a single multi-conductor connector, a network connector, or the like. Such alternative embodiments of a docking device may be used to communicate with other portable devices such as a PDA or mobile telephone. Although a docking station configured for a laptop computer is used to describe one example of the present invention, those skilled in the relevant art and others will appreciate that a wide variety of computing devices and docking devices fall within the scope of the present invention.

As will be better understood from the following description, slave switches 201 are configured to accommodate different types of electrical signals communicated between the computing device 103 and the docking device 104. As required, the slave switches 201 are configured to accommodate both analog and digital signals. As a matter of background, digital signals communicate computer logic values that are used by devices such as a PCI bus, a hard drive controller, or any other like device. For instance, digital signals can be in the voltage range of 0 to 3.3 volts and can alternate at high frequencies. Thus, the slave switches are selectively configured to communicate high-frequency digital signals. For example, the slave switches may be configured to communicate digital signals at frequencies as high as 33 MHz. In other embodiments, a slave switch may be configured to communicate digital signals at frequencies higher than 33 MHz. Converse to digital signals, analog signals are communicated between a computing device 103 and a docking device 104 for any number of high-current applications, such as a battery charger, CRT display adjusting signal, or the like. As described below, the slave switches are also selectively configured to communicate high-voltage and high-current analog signals.

Figure 3:
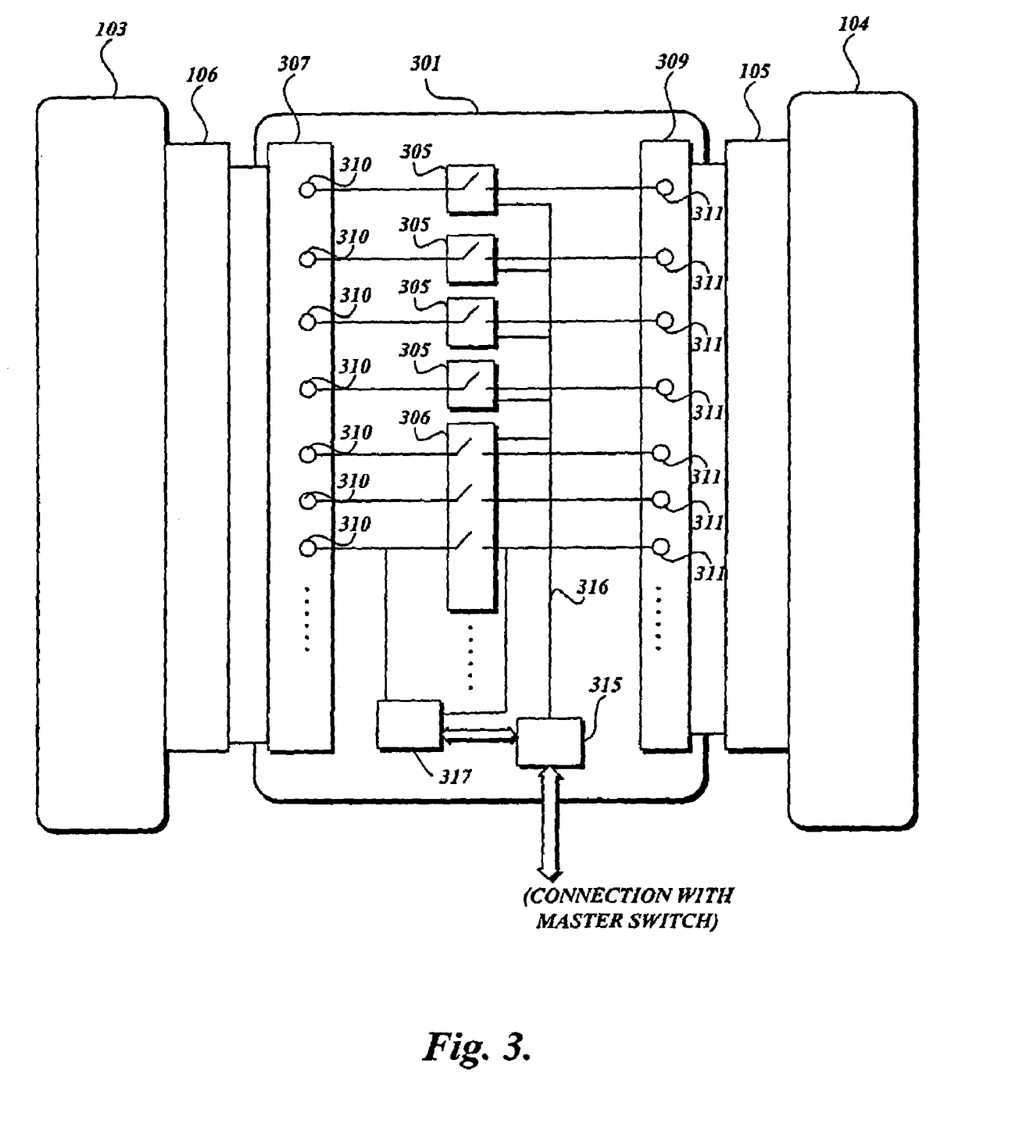
FIG. 3 is a schematic diagram of one exemplary embodiment of an electronic slave switch suitable for use in the system depicted in FIG. 2, formed in accordance with the present invention.

FIG. 3 is an exemplary schematic illustration of an embodiment of an electronic slave switch 301 suitable for use in the system of FIG. 2. As generally described above, the electronic slave switch 301 functions as a controlled interface between a computing device 103 and an associated docking device 104. In the illustrated embodiment, the electronic slave switch 301 comprises a first connector 307 that is configured to connect with a computing device connector 106. The first connector 307 provides a number of electrical paths between the contacts of the computing device connector 106 and corresponding electrical contacts 310 of the first connector 307. The illustrated embodiment of the electronic slave switch 301 also comprises a second connector 309 that is configured to connect with a docking device connector 105. The second connector 309 provides a number of electrical paths between the contacts of the docking device connector 105 and corresponding electrical contacts 311 of the second connector 309.

Also shown in FIG. 3, the electrical contacts 310 of the first connector 307 are individually connected to the electrical contacts 311 of the second connector 309 through a number of single pole-single throw relays 305 and switches 306. Each relay 305 and switch 306 is configured to create an open or closed circuit between corresponding contacts of the first and second connectors 307 and 309. In addition, the switches and relays are configured to open or close in response to a control signal received from an enable control unit 315. As will be better understood from the following description, the enable control unit 315 generates switch and relay control signals based on a control signal received from the master switch (203 of FIG. 2) and communicates the generated control signal to the relays 305 and switches 306 via a control channel 316, which may be formed by a wire, printed circuit board conductor, or the like. Likewise, as will be appreciated by one of ordinary skill in the art, a printed circuit board conductor, wire, or any other suitable electrical conductor may be used to connect the electrical contacts 310 and 311 of the first and second connectors 307 and 309 to their respective switch. As described next, preferably, the relays 305 pass high power analog signals such as AC power signals, CRT display adjusting signals, etc., and the switches 306 pass lower power digital signals.

FIG. 3 illustrates one example of a switch 306 operable for communicating digital signals between the first and second connectors 307 and 309. The switch 306 may be made from individual solid-state switching devices such as transistors, field effect transistors (FET) or the like. Alternatively, for example, the switch 306 may be an application specific integrated circuit (ASIC). Still further, the switch 306 can be any other suitable switch or relay that meets standard computer standard voltage, current, and propagation delay specifications. The electronic slave switch 301 may be configured with any number of switches 306 to accommodate any number of contacts 310 and 311 included in the first and second connectors 307 and 309. Although this example illustrates a single switch 306 configured to accommodate multiple contacts of the connectors 307 and 309, as noted above, this should be taken as exemplary, not limiting. A switch 306 formed in accordance with the present invention may take on a variety of forms configured to communicate any number of digital signals between the contacts 310 and 311 of the first and second connectors 307 and 309.

In one specific embodiment, the switch 306 may be a commercially available switch, such as a 10-bit bus switch provided by Texas Instruments, referenced as part No. SN74CBTD3384DW. As will be appreciated by those of ordinary skill in the art, this type of switch can be controlled by a control line 316 to open or close the circuit between a plurality of the contacts of the first and second connectors 307 and 309. In this specific embodiment utilizing the Texas Instruments 10-bit switch, the control channel 316 is connected to a control pin referred as the output enable (OE).

As described above, the electronic slave switch 301 is also configured to communicate analog signals. Preferably, the individual relays 305 are used for communicating analog signals between the computing device 103 and the docking device 104 via the connectors 307 and 309. As will be appreciated by those of ordinary skill in the art, a relay device used for communicating analog signals can be made from any electronically controlled switch, such as a mechanical relay, a high-powered solid state switch, or any other suitable relay or switch that meets computer standard current and voltage specifications.

In one specific example, each relay 305 is a commercially available relay, such as an Aromat® TQ4-5V mechanical relay, a component manufactured by Aromat Corporation of New Providence, N.J. In this specific embodiment, the control channel 316 is connected to a control contact of each relay, thereby creating a controllable mechanism that creates a closed or open circuit between the connected contacts 310 and 311 of the first and second connectors 307 and 309. Although the illustrated example shows individual single pole-single throw relays, suitable multi-pole relays can be used if desired, and fall within the scope of the invention.

As noted above, the electronic slave switch 301 also includes an enable control unit 315 that generates the electrical signals that control the relays 305 and the switch 306. The enable control unit 315 receives control signals from the master switch 203. Responsive to the control signals received from the master switch 203, the enable control unit 315 generates an output signal via the control channel 316 that causes the relays 305 and switch 306 to connect or disconnect the contacts 310 and 311 of the connectors 307 and 309. Although the illustrative embodiment shown in FIG. 3 includes an enable control unit 315 that generates a single output signal, alternate embodiments may include an enable control unit that generates a plurality of outputs, each designed to meet the voltage levels required by different types of relays and switches. Other embodiments of the present invention may include an electronic slave switch 301 that does not include an enable control unit 315. In such embodiments, the control pins of the relays 305 and switch 306 receive control signals directly from the master switch 203.

As will be readily appreciated by those skilled in the art and others, the first and second connectors 307 and 309 are configured to connect with any one of a variety of commercially available computer docking connectors. Thus, the seven-conductor example shown in FIG. 3 should be taken as exemplary, not limiting. The electronic slave switch 301 may include any combination or number of switches or relays necessary to accommodate different docking device and computing device connectors 105 and 106 having any combination of a wide variety of analog and/or digital signal paths.

If desired, the electronic slave switch 301 may also include a feedback circuit 317 for examining the connectivity between the computing device 103 and the associated docking station 104. During operation of embodiments including this alternative feature, the electronic slave switch 201 will first receive a command to electrically connect (dock) or electrically disconnect (dedock) the computing device 103 from the docking device 104. Thereafter, the feedback circuit 317 will examine at least one connection between the first and second connectors 307 and 309 and generate a status signal indicating that the connection is open or closed. The status signal may be sent to the enable control unit 315 for forwarding to the server 205, as shown in the example of FIG. 3. Alternatively, the status signal may be sent directly to the server 205.

In the illustrated embodiment, the feedback circuit 317 is electrically connected to a contact 310 of the first connector 307 and a related contact 311 of the second connector 309. The feedback circuit 317 measures the connectivity or resistance between the two connected contacts 310 and 311 and generates a status signal based on the results of the measurement. Other embodiments of feedback circuit 317 may include a commercially available circuit capable of measuring the connectivity or resistance between two electrical contacts.

Figure 4A:
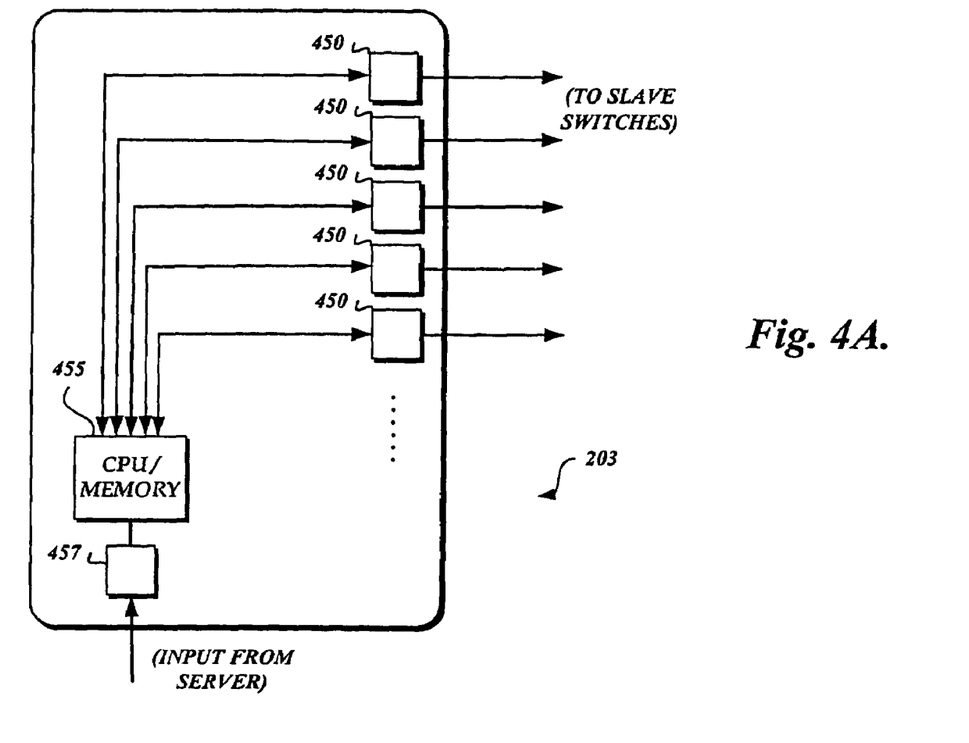
FIG. 4A is a schematic diagram of one exemplary embodiment of a master switch suitable for use in the system depicted in FIG. 2, formed in accordance with the present invention.

FIG. 4A is a block diagram illustrating an exemplary embodiment of a master switch 203 suitable for use in the system depicted in FIG. 2. The illustrated master switch 203 includes a central processing unit (CPU) 455 and a communications interface 457 configured to provide a communication link with the server 205. The CPU 455 includes a memory for storing software components for instructing the CPU 455 to exchange of data with the server 205 through the communications interface 457. Although the illustrated embodiment includes a CPU 455 and a communications interface 457, other master switch configurations fall within the scope of the invention, including a configuration of a CPU having the communications interface functionally built in to the CPU rather than provided by a separate component. Other designs of a master switch may include general logic circuits or an ASIC configured to respond to PNP ID queries. As also shown in FIG. 4A, the CPU 455 is configured to communicate with a number of connectors 450, illustrated in FIG. 4B and described below, each of which provides an independent electrical connection between the CPU 455 and one of the slave switches 201 (FIG. 2).

While the embodiment of the invention illustrated in FIG. 2 includes a master switch 203 controlled by a server 205, this illustration should be taken as exemplary and not limiting, since the master switch 203 may be configured in other ways. For instance, the master switch 203 may be configured with a user interface that allows a user to directly control each slave switch by actuating input devices on the user interface. In other embodiments, the server 205 and master switch 203 may comprise a single device. In such an embodiment, the master switch 203 may take the form of a controller card installed in a server or any other like computing device.

The communications interface 457 may take any suitable form, such as a universal serial bus (USB) interface. In embodiments employing such an interface, the CPU 455 is configured to control the communications interface 457 in accordance with the specifications of the USB standard. During operation, the interface 457 receives USB commands from the server 205 and decodes the received commands for interpretation by the CPU 455. In such embodiments, the USB command may comprise one or more codes to identify selected slave switches that are to be controlled. In response to receiving and interpreting the USB command, the CPU 455 will apply a high or low logic signal to one or more connectors 450, as required, for controlling the selected slave switches. In this manner, the server 205 will control one or more slave switches 201 through the USB interface causing the operation of the slave switches to simulate the action of docking or undocking one or more selected computing devices 103.

Figure 4B:
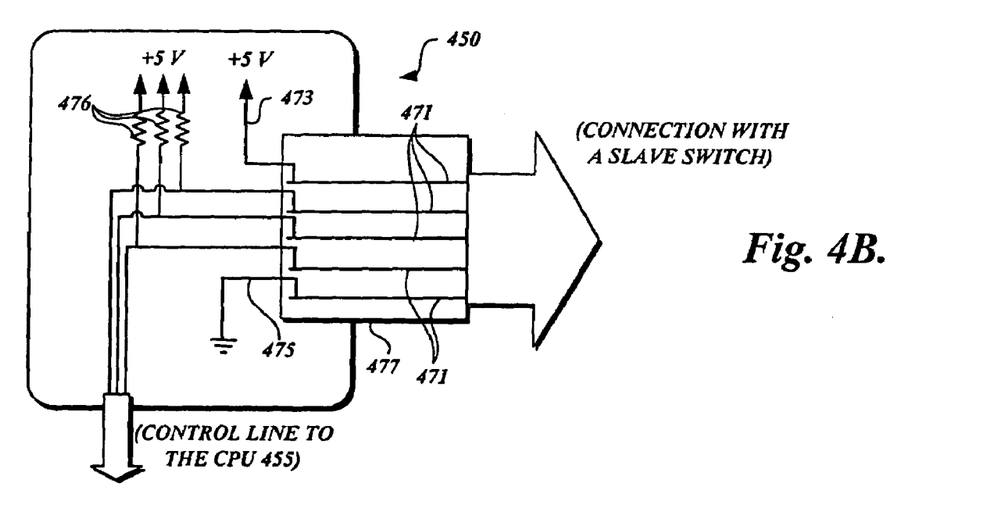
FIG. 4B is a schematic diagram of an exemplary connector suitable for use in the master switch depicted in FIG. 4A formed in accordance with the present invention.

FIG. 4B is a schematic diagram of the internal components of an exemplary connector 450 suitable for use in the master switch 203 depicted in FIG. 4A. Generally described, each connector 450 is configured to communicate the control signals generated by the master switch CPU 455 to individual slave switches through a cable 477 having a plurality of conductors 471. In addition, the connector 450 may include a number of other slave switch electrical connections. For instance, the exemplary embodiment of the connector 450, shown in FIG. 4B, provides a power and ground connection for the associated slave switch 201. More specifically, two conductors 471 of the cable 477 are used to connect a power source 473 and a ground source 475 to the associated slave switch. The other conductors 471 are used to communicate relevant commands and data between the CPU 455 of the master switch 203 and the associated slave switch 201. For instance, the conductors 471 of the cable 477 may be used to communicate switch commands, a switch status data, etc. Although FIG. 4B illustrates a cable 477 having five conductors 471, a connector 450, and cable 477, this illustration should be taken as exemplary, not limiting, since embodiments of the present invention may include any number of conductors. For example, the cable 477 may be a 10-baseT Ethernet cable having eight separate conductors.

If desired, the connector 450 may include safety devices for protecting the CPU 455 and other components of the system from short circuits. For example, as shown in FIG. 4B, the safety devices are formed by a plurality of pull up resistors 476 that connect the conductors 471 to a power source. As will be appreciated by those of ordinary skill in the art, other safety devices may be used to protect the components of the overall system.

Figure 5A:
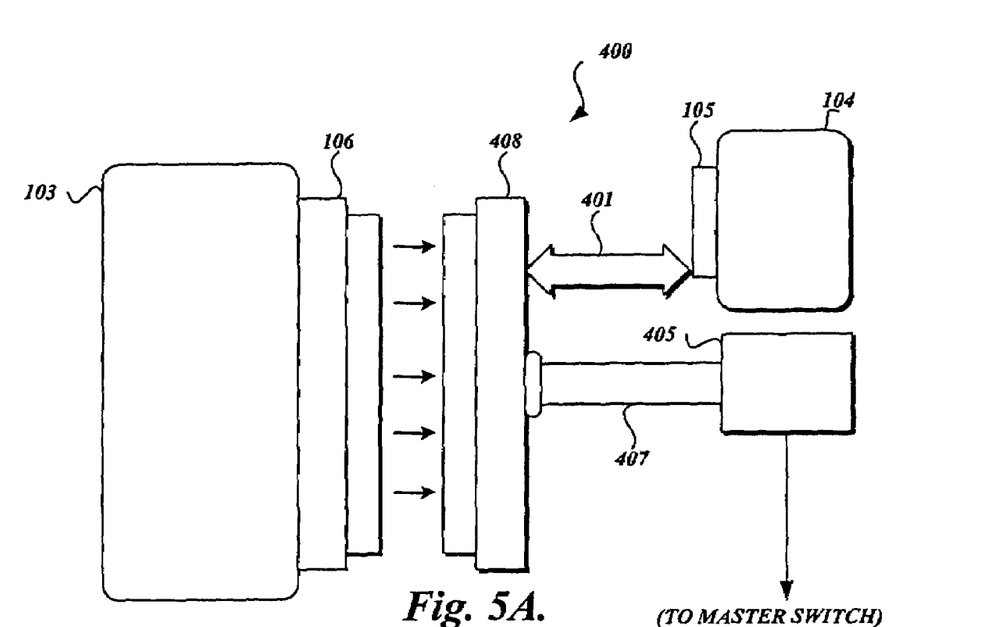
FIG. 5A is a block diagram of another exemplary embodiment of an electro-mechanical slave switch suitable for use in the system depicted in FIG. 2, formed in accordance with the present invention in a disengaged (undocked) position.
Figure 5B:
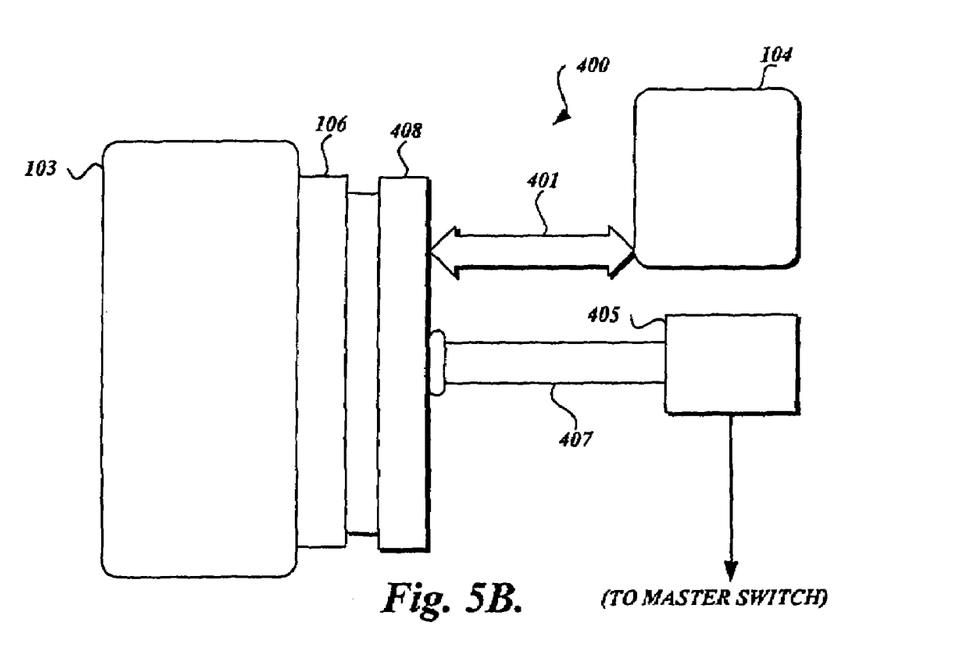
FIG. 5B is a block diagram of the electro-mechanical slave switch illustrated in FIG. 5A in an engaged (docked) position.

FIGS. 5A and 5B illustrate an exemplary electro-mechanical slave switch 400 suitable for use as the slave switch 201 of the test system 200 illustrated in FIG. 2. Generally described, the electro-mechanical slave switch controls the electrical connection between an individual computing device and an associated docking device by the use of an electro-mechanical actuator. The illustrated electro-mechanical slave switch 400 includes an actuator 405 that is configured to disengage or engage a slave switch connector 408 with a computing device connector 106. The illustrated electro-mechanical slave switch 400 also includes a flexible cable 401 for connecting the slave switch connector 408 with the connector 105 of a docking device 104. Controlling the engaging or disengaging of the slave switch connector 408 with the computing device connector 106 allows the electro-mechanical slave switch 400 to simulate a docking or undocking action.

Preferably, the actuator 405 comprises a solenoid mounted in a fixed position having a control arm 407 affixed to the slave switch connector 408, which is movable back and forth into and out of engagement with the computing device connector 106. Similar to the switches shown in FIG. 3, the solenoid is electrically controlled by other external components, such as the master switch 203 or server 205. In one embodiment, the solenoid is configured to move the slave switch connector 408 in and out of engagement with the computing device connector 106. As shown in FIG. 5A, when the solenoid retracts the control arm 407, the slave switch connector 408 is moved out of engagement with the computing device connector 106. In this position, an open circuit exists between the contacts of the slave switch connector 408 and the contacts of the computing device connector 106. In this embodiment, the solenoid retracts the control arm 407 responsive to control signals received from the master switch 203.

As shown in FIG. 5B, when the solenoid extends the control arm 407, the slave switch connector 408 moved into engagement with the computing device connector 106. When the slave switch connector 408 is engaged with the computing device connector 106, the computing device 103 may communicate with the docking device 104 through the connectors 106 and 408, and the cable 401 connected to the docking device 104. In this embodiment, the solenoid extends the control arm 407 responsive to specific control signals received from the master switch 203.

As can be appreciated by one of ordinary skill in the art, the flexible cable 401 may be made from any multi-conductor wire having sufficient flexibility for allowing the slave switch connector 408 to move in and out of the computing device connector 106. The flexible cable 401 may be electrically connected to the docking device 104 by any compatible docking device connector. While a permanent, hard-wired connection between the flexible cable 401 and docking device 104 falls within the scope of the invention, such a connection will likely be undesirable in most environments of use. In addition, while FIGS. 5A and 5B shows an electro-mechanical slave switch utilizing a solenoid, it is to be understood that other mechanical devices capable of engaging or disengaging two connectors fall within the scope of the invention.

The above-described computer test system 200 may be used in a number of test procedures involving the action of docking or undocking a computer. For illustrative purposes, the following description first provides an overview of the different types of docking actions. Following that, several example routines for testing a plurality of dockable computing devices are described.

As will be appreciated by those skilled in the art, there are three generally known types of docking actions employed during the testing of portable computing devices: cold, warm, and hot. A cold dock or cold undock means that the operating system of the computing device has been shut down before the computing device docked or undocked, i.e., is inserted into or removed from a docking device. For example, the cold undock of a computing device running the Microsoft® Windows® operating system involves the execution of a "Shut Down" command prior to docking or undocking. After the computing device is shut down, the computing device is docked or undocked.

A warm dock or warm undock means that the operating system of the computing device has been put into a standby or sleep mode before the computing device is docked or undocked. In one example involving a computing device running the Microsoft® Windows® operating system, a warm dock or warm undock procedure involves the execution of the "Hibernate" command or "Stand By" command prior to docking or undocking. After the computing device is in hibernate or stand by mode, the computing device is docked or undocked.

A hot dock or hot undock means that the operating system of the computing device is running, with or without programs and documents open, when the computing device is docked or undocked. There is only one way to perform a hot dock: inserting a computer into a docking device while the operating system of the computer is running. There are two ways to perform a hot undock—(1) by using an eject command, such as the "Eject PC" command in the Windows 2000 user interface, or (2) by physically removing the computing device from the docking device using whatever mechanism the docking device provides.

As will be described in more detail below, various types of dock and undock actions involving various operating states of a computing device can be used in a variety of various test routines. Although the following examples involve warm and cold docking actions, the present invention can be used to accommodate various docking actions involving a number of operating states of a computing device. For instance, as can be appreciated by one of ordinary skill in the art or other, there exist a number of power management states in which a computing device can operate. For instance, one industry standard has six power management states, S0 to S5, where: S0 is a fully operational state, S1-S3 are varying degrees of power save states, S4 is a hibernate state, and S5 is a power-off state. Also known in the art, there are a number of different methods used for transitioning a computing device to each one of these states. The following examples can utilize a variety of different methods to transition a computing device into any one of the above-described power management states.

Figure 6:
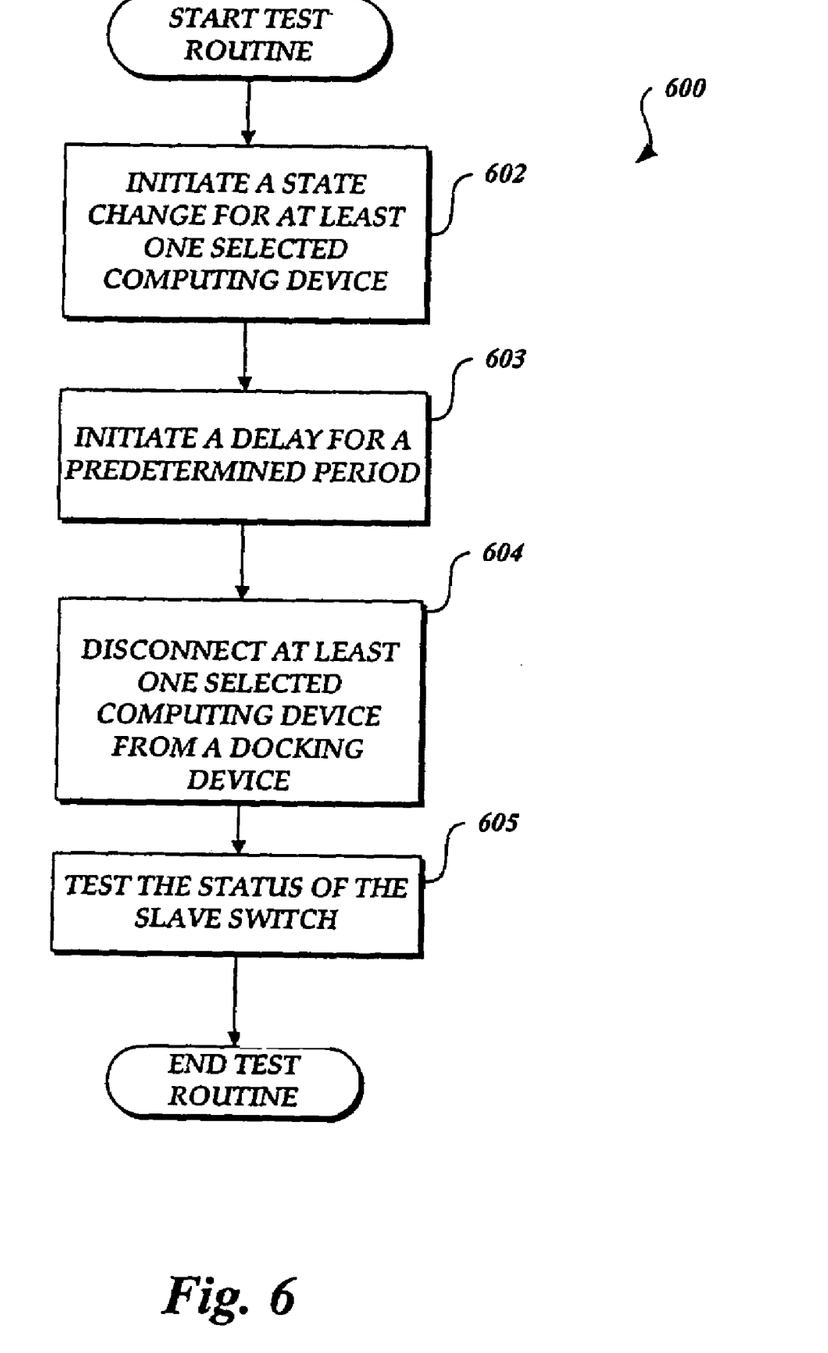
FIG. 6 is a flow diagram of an exemplary undock test routine, formed in accordance with the present invention.

FIG. 6 is a flow diagram illustrating an exemplary test routine 600 for testing hardware and software applications that are potentially effected by the docking action of a computing device. Generally described, the test routine 600 utilizes the above-described test system 200 for automating a test procedure involving a docking action, such as a warm undock or cold undock. For example, the test routine 600 may be utilized to determine if an operating system of a computer has properly transitioned into a sleep mode before the computer is undocked.

Referring now to the system diagram of FIG. 2 and the flow diagram of FIG. 6, the test routine 600 is described in further detail. As shown in FIG. 6, the test routine 600 begins at block 602 where the server 205 sends a command to a selected computing device to initiate a state change in a hardware or software component. For example, the server 205 may instruct the operating system of a selected computing device 103 to initiate a shut down or a sleep command. In another example, the server 205 may initiate a timing mechanism, such as a computer's real-time clock (RTC), to initiate a sleep command at a specific time. This part of the process may also involve other state changes, such as a transition from a running mode of an operating system to a hibernation mode, or the like. Such state changes are known to those skilled in the art; thus, the details of which are not described herein.

The server 205 may initiate a state change in one or more computing devices by communicating commands through the network 211, or by any other like medium. Depending on the objective of the test, the server 205 may be configured to transmit the state change command to one selected computing device 103. Alternatively, the server 205 may broadcast the state change command to a number of selected computing devices 103 over the network 211. As described above, a user-configured script or test software application stored on the server 205 may be used to choose the selected computing devices out of the collection of computing devices 103 connected to the test system 200.

Following the process of block 602, the test routine 600 then proceeds to block 603 where the server 205 initiates a delay for a predetermined time period. The delay initiated in block 602 allows the server 205 to coordinate the test routine 600 with the state change processed in the selected computing devices 103. For example, in a test involving a cold undock, if the server 205 instructs a selected computing device to shut down, the server 205 may delay the test routine 600 for approximately one minute to help ensure that the selected computing device has completely shut down. As will be appreciated by those of ordinary skill in the art, the delay initiated in block 603 may be any other time period deemed necessary to assist the coordination of the functions of the server 205 and the selected computing devices.

Next, as shown in block 604, the server 205 causes one or more slave switches to disconnect the selected computing devices 103 from their associated docking devices 104. In this part of the process, the server 205 sends a command to the master switch 203, which translates the command to identify the selected computing devices. In turn, the master switch 203 sends a control signal to the slave switches attached to the selected computing devices to electrically isolate the selected computing devices from their associated docking devices.

As shown in block 605, if desired, the server 205 may initiate a test to determine the status of the slave switches attached to the selected computing devices. In this part of the test routine 600, the server 205 sends a command to the master switch 203 to read the status signals received from one more slave switches. For example, the master switch 203 may examine the output of one or more test circuits (317 of FIG. 3) to determine the status of a particular slave switch. If desired, the server 205 or the master switch 203 may cause the status of each slave switch to be displayed on a graphical user interface. Following the process of block 605, the test routine 600 terminates.

Figure 7:
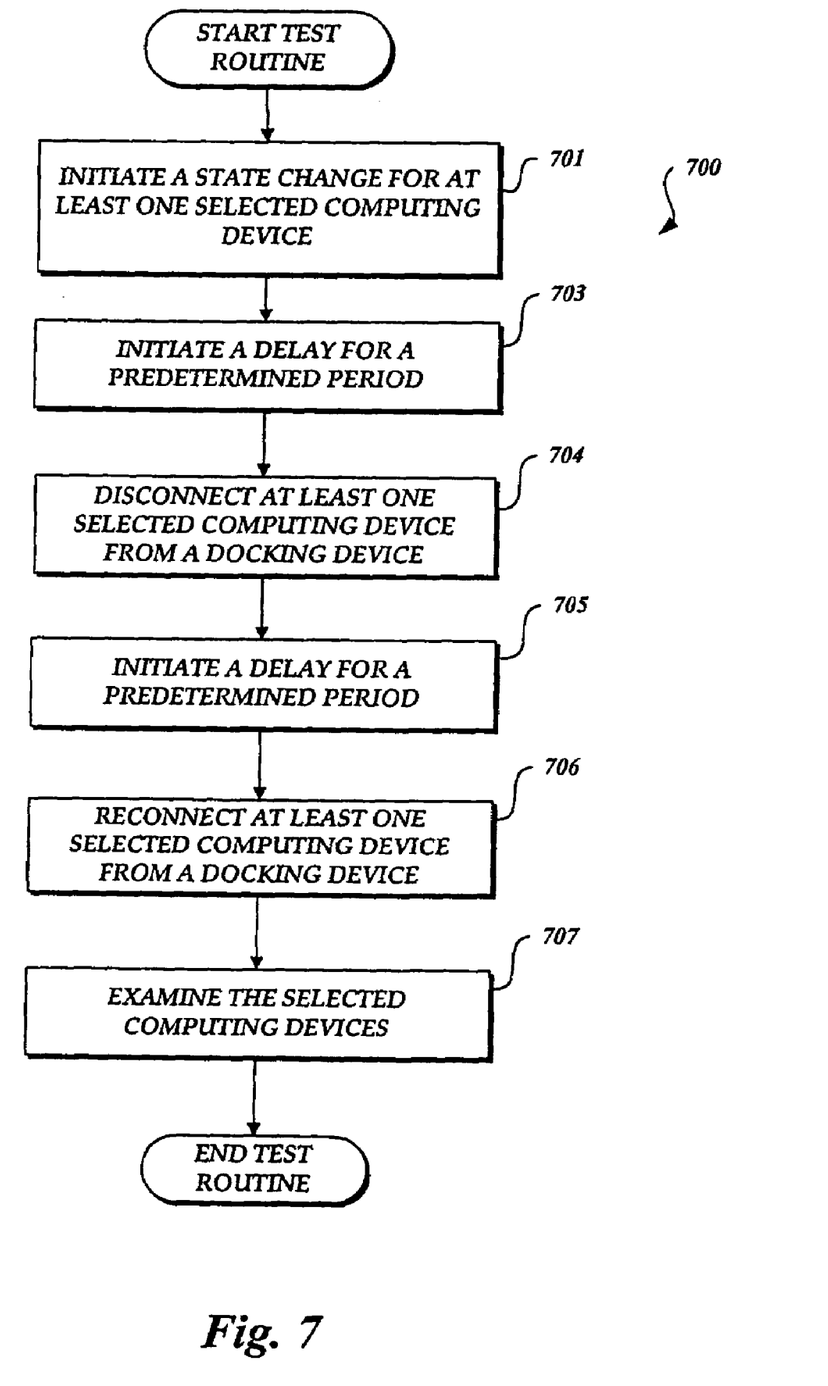
FIG. 7 is a flow diagram of an exemplary dock and undock test routine, formed in accordance with the present invention.

FIG. 7 is a flow diagram illustrating another exemplary embodiment of a test routine 700 for testing hardware and software applications of a computing device. This test routine is an example of an automated test routine that involves both a dock and undock action. Again referring to the system diagram of FIG. 2 and the flow diagram of FIG. 7, the test routine 700 is described in further detail below.

The test routine 700 begins at block 701 where the server 205 instructs one or more selected computing devices 103 to initiate a state change in a hardware or software component. As described above, with reference to process block 602 of FIG. 6, the server 205 may initiate a number of software or operating system state changes, such as a reboot command, a sleep mode command, or the like. In this part of the process, the state change initiated in block 701 may include a state change command that allows the computing device 103 to automatically recover to a running mode. For instance, the server 205 may initiate an instruction for a computing device 103 to transition into a sleep mode, and then transition back into a running mode after a predetermined time period. Such a state change may employ a timer of the selected computing devices, such as the RTC, to control the functions of the selected computing device 103.

After the state change command has been initiated in block 701, the test routine 700 continues to block 703 where the server 205 initiates a delay. As described above, with reference to block 603 of FIG. 6, the server 205 may delay the test routine 700 to coordinate the functions of the server 205 with the functions of each selected computing device. For example, if the selected computing devices have been instructed to transition into a sleep mode, the server 205 may delay the test routine for approximately one minute.

After the delay process is complete, the test routine 700 proceeds to block 704 where the server 205 controls one or more slave switches to electronically isolate the selected computing devices from their associated docking devices. As described above, the server 205 may utilize the functionality of a master switch and a plurality of slave switches to carry out this part of the test routine 700. Thus, the process of block 704 is implemented by the test system 200 simulating an undocking action of the selected computing devices. Next, if desired, the server 205 may then check the status of each slave switch to confirm that the selected computing devices have been electronically isolated from their associated docking devices.

After the process of block 704, the test routine 700 continues to block 705 where the server 205 initiates a second delay. In this part of the process, the server 205 may delay the test routine 700 to coordinate the functions of the server 205 with the internal functions of each selected computing device 103. For example, at block 701, if the server 205 instructed the selected computing devices to transition into a sleep mode and return to a running mode after one minute, the server 205 may initiate delay in block 705 for ninety seconds to ensure that the selected computing devices are back in a running mode before the test routine 700 continues. As will be readily appreciated by those skilled in the art, the delay initiated in block 705 may be configured to any suitable time period that helps coordinate each component of the test system 200. For instance, the delay of block 705 may be a short time period to enable the test routine 700 to take the next action, such as a docking action (block 706), before the selected computing devices return to a running mode.

The process then continues at block 706 where the server 205 initiates a command to electrically connect the selected computing devices to their associated docking devices. As described above, the server 205 initiates a command to the master switch 203 that, in turn, communicates a signal to the slave switches to electrically connect the selected computing devices 103 with the associated docking devices 104. In this part of the process, the server 205 may also confirm the completion of the process of block 706 by analyzing the status signal of each slave switch.

As shown in block 707, the server 205 may then initiate a test to determine if the selected computing devices 103 successfully executed each part of the test routine 700. For example, the server 205 may send a signal through the network 211 to determine if a selected computing device 103 has successfully restarted after it has been disconnected and reconnected to a docking station. As will be appreciated by those of ordinary skill in the art, the process initiated in block 707 may involve a number of tests, and involve a test of any type of software application that may be effected by a docking action. Once the server 205 completes the test initiated in block 707, the results of the test may be stored and/or communicated to another device, such as a display. Following the process of block 707, the test routine 700 terminates.

As described above, the system and method of the present invention provide a computer-controlled mechanism for automating computer and software test procedures that involve a docking action. More specifically, the present invention provides an automated system and method that can simulate the docking or undocking of a large number of computers during a software test procedure without human intervention.

While several embodiments of the invention have been illustrated and described, it will be appreciated that various changes can be made therein without departing from the scope of the invention as defined by the appended claims. For example, rather than the actuator connection mechanism illustrated in FIGS. 5A and 5B being used to connect and disconnect a slave switch connector to the connector of a computing device, a similar actuator connection mechanism could be used to connect and disconnect a slave switch connector to the connector of a docking station. In addition, as noted above, it is to be understood that the examples described above are for illustrative purposes and are not intended to be exhaustive or to limit the invention to the precise forms disclosed.

The invention claimed is:

1. A system for improving the testing of a plurality of computing devices each designed to dock with an associated docking device, the system comprising:
a plurality of slave switches, each slave switch configured to electrically connect the plurality of contacts of a connector of a computing device with the plurality of contacts of a connector of an associated docking device; and
a master switch operative to transmit control signals to said plurality of slave switches to control the electrical connection or isolation of selected computing devices from their associated docking devices.

2. The system of claim 1, further comprising:
a server for generating commands to control said electrical connection or isolation of selected computing devices from their associated docking devices, said server transmitting said commands to said master switch, in response to the receipt of said commands, said master switch transmitting control signals to said slave switches that control the electrical connection or isolation of selected computing devices from their associated docking devices.

3. The system of claim 2, wherein the system further comprises a network for providing communication between the server and the plurality of computing devices, and wherein the server:
transmits a transition command to the selected computing devices, that causes the selected computing devices to transition into a specified mode; and
transmits an isolation command for said master switch that causes said slave switches associated with said selected computing devices to electrically isolate the selected computing devices from their associated docking devices.

4. The system of claim 3, wherein the specified mode is a shut down mode.

5. The system of claim 3, wherein the specified mode is a sleep mode.

6. The system of claim 1, wherein at least one of the plurality of slave switches is operative to communicate status signals to the master switch to indicate if the computing device associated with at least one slave switch is electrically connected with its associated docking device.

7. The system of claim 1, wherein at least one slave switch of the plurality of slave switches comprises a plurality of switches that are each configured to electrically connect and disconnect the plurality of contacts of an associated computing device to corresponding electrical contacts of an associated docking device in response to the receipt of control signals from said master switch.

8. The system of claim 7, wherein selected individual switches of the plurality of switches are operable to pass analog and digital signals.

9. The system of claim 7, wherein at least one slave switch of the plurality of slave switches comprise an actuator configured to control the electrical connection and disconnection between the plurality of contacts of the connector of the docking device and the plurality of contacts of the connector of the computing device in response to the receipt of control signals from said master switch.

10. The system of claim 9, wherein;
the slave switch further comprises a slave switch connector including a plurality of contacts electrically connected to the plurality of contacts of the connector of the docking device;
the actuator is a solenoid having a control arm affixed to the slave switch connector; and
the control arm is coupled to the slave switch connector so as to control engaging and disengaging of the plurality of contacts of the slave switch connector and the plurality of contacts of the connector of the computing device in response to said control signal.

11. In a system having a plurality of computing devices, in which each computing device has a docking device associated therewith, the plurality of computing devices being in communication with a server, a method for improving the testing of the plurality of computing devices, the method comprising:
transmitting a command to selected computing devices of the plurality of computing devices, that causes the selected computing devices to transition into a specified mode; and
controlling slave switches attached to the selected computing devices to electrically isolate the selected computing devices from their associated docking devices.

12. The method of claim 11, further comprising controlling the slave switches attached to the selected computing devices to electrically connect the selected computing devices to their associated docking devices.

13. The method of claim 11, wherein the specified mode is a shutdown mode of an operating system.

14. The method of claim 11, wherein the specified mode is a sleep mode of an operating system.

* * * * *